(12) United States Patent
Ruszala et al.

(10) Patent No.: US 8,799,025 B2
(45) Date of Patent: Aug. 5, 2014

(54) INSURANCE CLAIM DATA EXCHANGE

(75) Inventors: Anthony C. Ruszala, Simsbury, CT (US); Steven A. Hatch, Tolland, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 808 days.

(21) Appl. No.: 12/582,174

(22) Filed: Oct. 20, 2009

(65) Prior Publication Data

US 2011/0015949 A1   Jan. 20, 2011

Related U.S. Application Data

(60) Provisional application No. 61/226,087, filed on Jul. 16, 2009.

(51) Int. Cl.
*G06Q 40/08* (2012.01)
(52) U.S. Cl.
USPC .................................. 705/4; 705/7.15; 705/38
(58) Field of Classification Search
None
See application file for complete search history.

(56) References Cited

U.S. PATENT DOCUMENTS

| | | | | |
|---|---|---|---|---|
| 4,987,538 | A * | 1/1991 | Johnson et al. | 705/2 |
| 7,395,217 | B1 * | 7/2008 | Stevens et al. | 705/4 |
| 2001/0037224 | A1 * | 11/2001 | Eldridge et al. | 705/4 |
| 2002/0103680 | A1 * | 8/2002 | Newman | 705/4 |
| 2002/0128883 | A1 * | 9/2002 | Harris | 705/4 |
| 2005/0182666 | A1 * | 8/2005 | Perry et al. | 705/4 |
| 2005/0203828 | A1 * | 9/2005 | Lyakovetsky | 705/38 |
| 2006/0253306 | A1 * | 11/2006 | Richardson et al. | 705/4 |
| 2007/0112670 | A1 * | 5/2007 | DeFrancesco et al. | 705/38 |
| 2008/0154672 | A1 * | 6/2008 | Skedsvold | 705/7 |
| 2008/0243559 | A1 * | 10/2008 | Stevens et al. | 705/4 |
| 2009/0106053 | A1 * | 4/2009 | Walker et al. | 705/4 |
| 2010/0094666 | A1 * | 4/2010 | Pendergrass et al. | 705/4 |
| 2011/0010186 | A1 * | 1/2011 | Mashore et al. | 705/2 |
| 2011/0145011 | A1 * | 6/2011 | Shell et al. | 705/2 |

* cited by examiner

*Primary Examiner* — Robert Niquette
(74) *Attorney, Agent, or Firm* — Howard IP Law Group, PC

(57) ABSTRACT

According to some embodiments, workers' compensation claims are received at a payor processing system from a plurality of remote bill input devices. The workers' compensation claims may be transformed in accordance with a jurisdiction-based claims processing rule. The transformed workers' compensation claims may then be transmitted to a workers' compensation adjudication engine.

21 Claims, 9 Drawing Sheets

| CLAIM IDENTIFIER 802 | CLAIM AMOUNT 804 | PATIENT INFORMATION 806 | PROVIDER INFORMATION 808 | CLAIM STATUS 810 |
|---|---|---|---|---|
| C_1001 | $750.00 | PAT_5253 | PROV_4633 | SCRUBBED |
| C_1002 | $1,500.00 | PAT_1234 | PROV_2486 | DUPLICATE |
| C_1003 | $200.00 | PAT_9012 | PROV_9236 | EXCEPTION |
| C_1004 | $800.00 | PAT_3715 | PROV_0425 | PENDING |
| C_1005 | $375.00 | PAT_2785 | PROV_9764 | ADJUDICATED/PAID |

FIG. 8

INSURANCE CLAIM DATA EXCHANGE

CROSS-REFERENCE TO RELATED APPLICATIONS

The present application claims the benefit of U.S. Provisional Patent Application No. 61/226,087 entitled "SYSTEMS AND METHODS HAVING A CLAIM DATA EXCHANGE TO FACILITATE WORKERS' COMPENSATION CLAIMS PROCESSING" and filed on Jul. 16, 2009. The entire content of that application is incorporated herein by reference.

BACKGROUND

A "payor" associated with an insurance program may facilitate payments made to health care providers. In the United States ("US"), for example, a payor might receive bills from a doctor, hospital, or pharmacy in connection with the Medicaid and/or Medicare insurance programs. Typically, health care provides use standard codes (e.g., describing treatments or medicines given to patients) and/or electronic transmission formats when submitting bills or claims to be processed by a payor. Moreover, the rules that govern such programs apply through the US and change relatively infrequently. As a result, the processing and review of these types of claims by a payor may be performed in a timely and efficient manner.

Claims associated with other types of insurance programs, however, may be more complex and time consuming to process. Consider, for example, a payor enterprise that arranges to provide payments to doctors, hospitals, and/or pharmacies in connection with the various workers' compensation insurance systems established throughout the US. Note that these programs are implemented on a state-by-state basis and different codes and/or transmission formats might be used by health care providers in different states. Moreover, different rules might apply to the processing of claims in each state (e.g., different rules associated with appropriate payment amounts). Still further, changes may be made to the rules on a relatively frequent basis (e.g., because fifty different states may review and adjust rules at various times). As a result, the processing of claims for these types of insurance programs may be complex, time consuming, and error prone and a payor may find it difficult to maintain an automated claims processing system.

BRIEF DESCRIPTION OF THE DRAWINGS

FIG. 8 is a tabular view of a portion of a claim information database in accordance with some embodiments of the present invention.

SUMMARY OF THE INVENTION

According to some embodiments, workers' compensation claims are received at a payor processing system from a plurality of remote bill input devices. The workers' compensation claims may be transformed in accordance with a jurisdiction-based claims processing rule. The transformed workers' compensation claims may then be transmitted to a workers' compensation adjudication engine.

Other embodiments include: means for receiving, at a payor processing system, workers' compensation claims from a plurality of remote bill input devices; means for automatically transforming the workers' compensation claims in accordance with a jurisdiction-based claims processing rule; and means for transmitting the transformed workers' compensation claims directly to a workers' compensation adjudication engine.

In some embodiments, a communication device associated with claim data exchange receives information from and/or transmits information to remote devices. The information may be exchanged, for example, via public and/or proprietary communication networks.

A technical effect of some embodiments of the invention is an improved and automated claim processing system and data exchange for payors, health care providers, and workers. With this and other advantages and features that will become hereinafter apparent, a more complete understanding of the nature of the invention can be obtained by referring to the following detailed description and to the drawings appended hereto.

DETAILED DESCRIPTION

Figure 1:
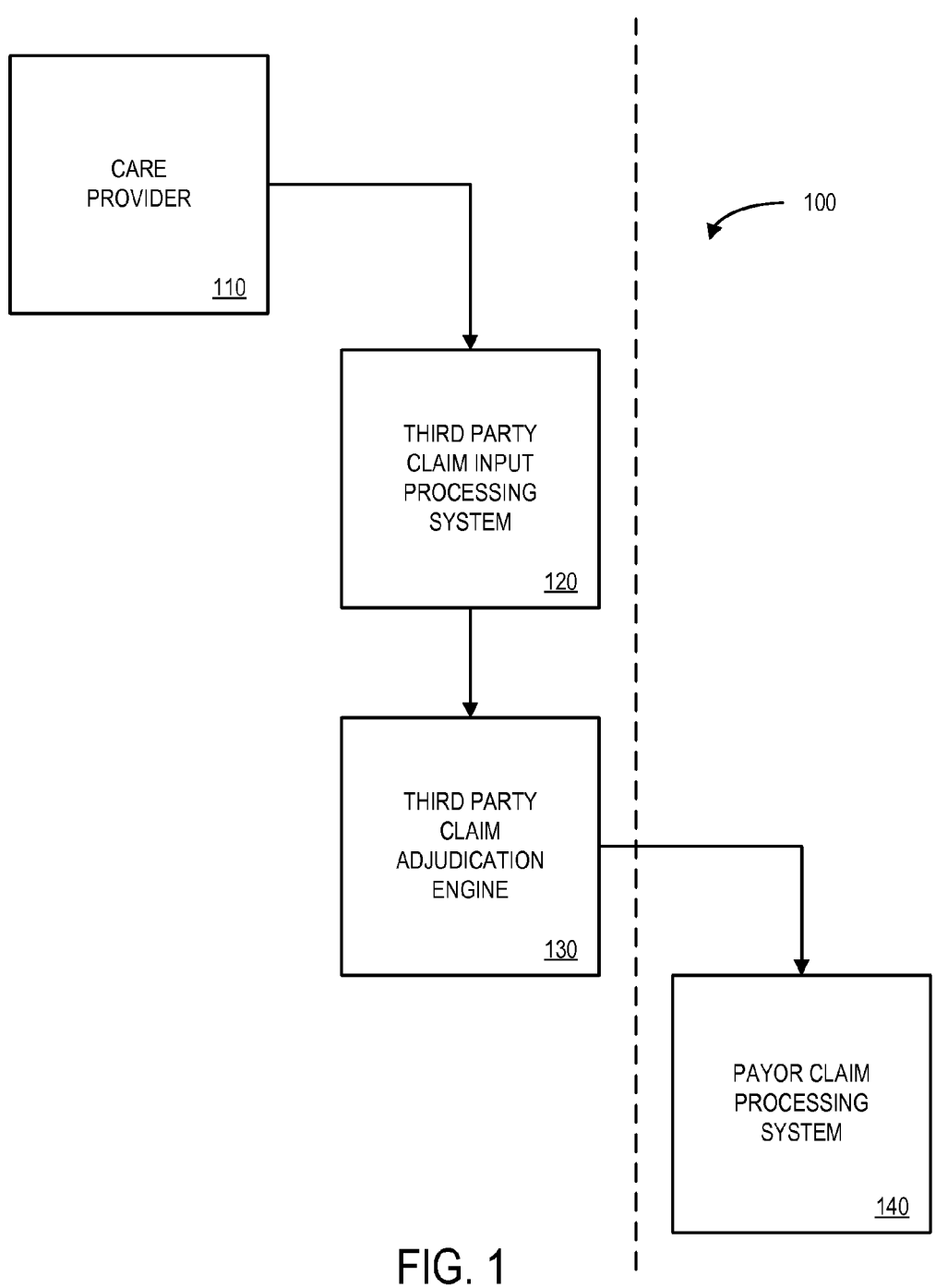
FIG. 1 is block diagram of a system for processing workers' compensation claims.

FIG. 1 is block diagram of a system 100 for processing workers' compensation claims. A "payor" associated with an insurance program may facilitate payments made to health care providers 110. A workers' compensation claim may include both a lost time portion and a medical bill portion. As used herein, automated "claim" processing is associated with the medical bill portion of the workers' compensation claim. Initially, a care provider 110 may submit a claim (e.g., a bill or invoice) to a third party claim input processing system 120 (e.g., by sending a paper invoice, a facsimile, or an electronic message to the third party claim input processing system 120). Multiple claims (e.g., bills) can be associated with a single insured's injury. For example, an injured insured may visit two or more different medicals specialist and require different medicines.

The third party claim input processing system 120 may then re-format the information and forward information about the claim to a third party claim adjudication engine 130. The third party claim adjudication engine 130 may then review the claim (e.g., medical bill) and determine whether or not the claim should be paid and/or an appropriate amount that should be paid to the care provider 110 (e.g., based on the workers' compensation rules applicable given the geographic location of the care provider 110). The third party claim adjudication engine 130 may then forward the information to a payor claim processing system 140 (where the payor is represented by the area to the right of the dashed line in FIG. 1), which in turn may arrange for the care provider 110 to receive payment.

In this way, the system 100 may help provide payments to care providers 110 (e.g., doctors, hospitals, and/or pharmacies) in connection with the various workers' compensation insurance systems established throughout the US. Note that these programs are implemented on a state-by-state basis and different codes and/or transmission formats might be used by health care providers in different states (e.g., different C schedules may be used by different states). Moreover, different rules might apply to the processing of claims in each state (e.g., different rules associated with appropriate payment amounts, timing requirements, and/or treatment guidelines). Still further, changes may be made to the rules on a relatively frequent basis (e.g., because fifty different states may review and adjust rules at various times). As a result, the processing of claims for these types of insurance programs may be complex, time consuming, and error prone and the third party claim input processing system 120, third party claim adjudication engine 130, and payor claim processing system 140 may find it difficult to maintain automated claims processing apparatus.

Figure 2:
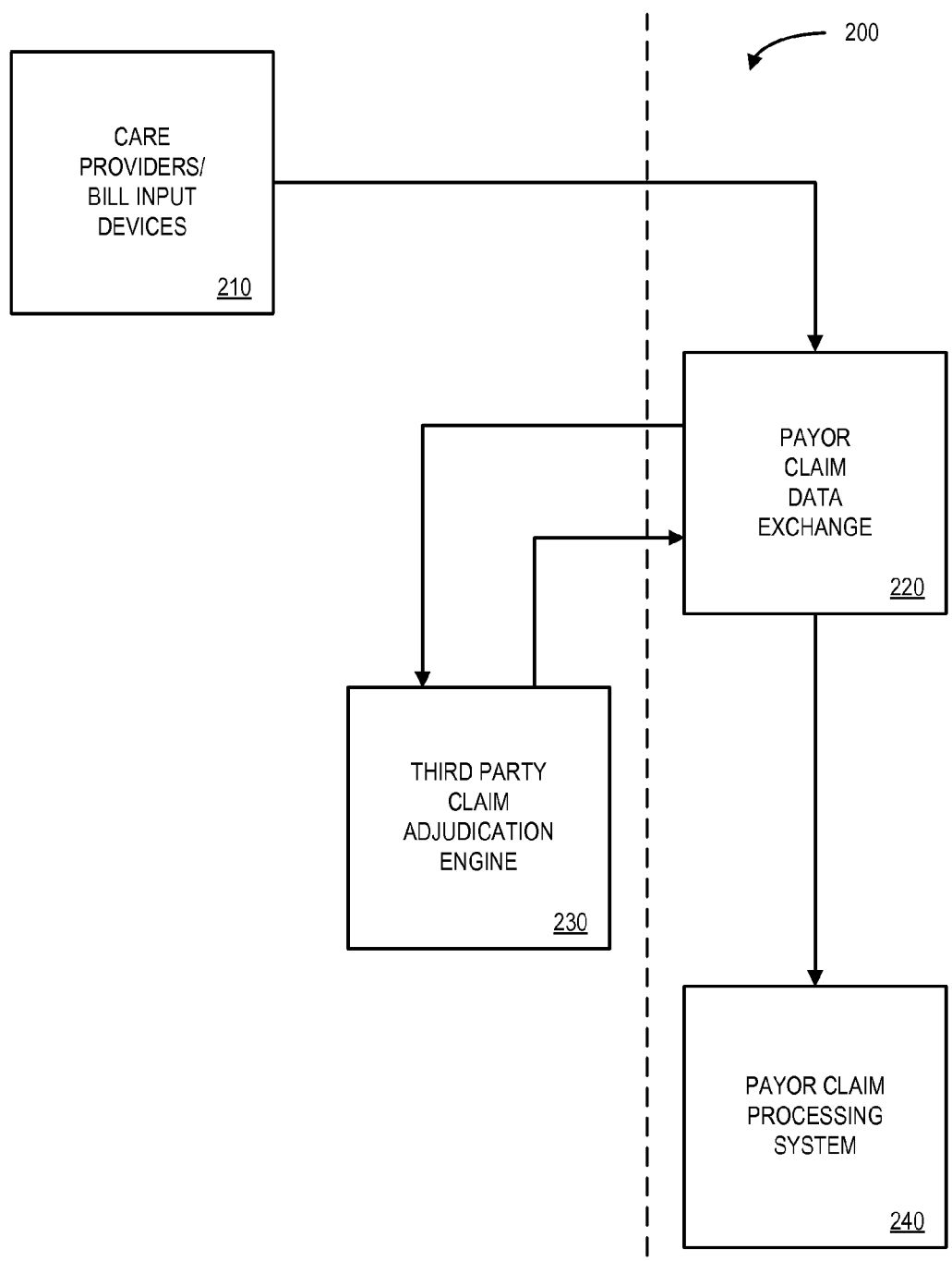
FIG. 2 is block diagram of a system for processing workers' compensation claims according to some embodiments of the present invention.

To address these issues in connection with some embodiments of the present invention, FIG. 2 is block diagram of a system 200 for processing workers' compensation claims. As before, a payor associated with an insurance program may facilitate payments made to health care providers 210. In this case, a care provider 210 may submit a claim (e.g., bill) to a remote payor claim data exchange 220 (e.g., by sending a paper invoice, a facsimile, or an electronic message to the payor claim data exchange 220).

The payor claim data exchange 220 may then automatically re-format the information and forward information about the claim to a third party claim adjudication engine 230. As used herein the term "automated" indicates that at least some part of a step associated with a process or service is performed with little or no human intervention. By way of examples only, the payor claim data exchange might be associated and/or communicate with a Personal Computer (PC), an enterprise server, and/or a database farm.

The third party claim adjudication engine 230 may then review the claim and determine whether or not the claim should be paid and/or an appropriate amount that should be paid to the care provider 210 (e.g., based on the workers' compensation rules applicable given the geographic location of the care provider 210). By way of examples only, the third party claim adjudication engine 230 might look for duplicate claims, incomplete or incorrect data in a required data field, and/or evaluate a claim number to determine whether or not it is valid. The third party claim adjudication engine 230 may then return the determined information to the payor claim data exchange 220, which may in turn use that information to transmit data to a payor claim processing system 240 (where the payor is represented by the area to the right of the dashed line in FIG. 1), which in turn may arrange for the care provider 210 to receive payment.

Any of the devices described in connection with the system 200 may access information in one or more databases. The databases may include, for example, information about claims or rules that govern claims. Moreover, any of the devices may exchange information via a communication network. These devices (and any of the other devices described herein) could be associated with, for example, a server, a PC, a mobile or laptop computer, or any other appropriate storage and/or communication device to exchange information via a web site and/or a communication network. As used herein, devices (including those associated with the payor claim data exchange 220 and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The devices of FIG. 2 might, according to some embodiments, be accessible via a Graphical User Interface (GUI). The GUI might be used, for example, to dynamically display existing claim information, to receive new claim information, and/or to input or output information about rules that govern workers' compensation claims.

Although a single payor claim data exchange 220 is shown in FIG. 2, any number of such devices may be included. Moreover, various devices described herein might be combined according to embodiments of the present invention. For example, in some embodiments, the payor claim data exchange 220 and payor claim processing system 240 might be co-located and/or may comprise a single apparatus.

The payor claim data exchange 220 might include, for example, a communication device to receive information from a plurality of remote care provider/bill input devices 210. The provider/bill input devices 210 might be associated with, for example, a health care provider, a scanning service, an e-bill provider, and/or a pharmacy benefits manager.

The payor claim data exchange 220 might further include a processor coupled to the communication device and a storage device in communication with the processor and storing instructions adapted to be executed by said processor to receive a first workers' compensation claim from a first remote bill input device 210 and to receive a second workers' compensation claim from a second remote bill input device 210. In this case, the payor claim data exchange 220 might transform the first and second workers' compensation claims in accordance with a claims processing rule. Moreover, the payor claim data exchange 220 might transmit the transformed first and second workers' compensation claims to third party adjudication engine 230.

The third party adjudication engine 230 might, for example, integrate with one or more Preferred Provider Organizations ("PPOs") and/or pharmacy networks and implement bill adjudication model that is regulatory compliant. The third party adjudication engine 230 might also, in some cases, provide pre-processing edits (e.g., data and claim validation) and/or re-submission and duplicate processing. The third party adjudication engine 230, in some embodiments, may further generate an explanation of benefits, provide state and carrier reporting, implement claim management, and support an image viewer to display document images.

Note that the payor claim data exchange 220 may be implemented as an exchange having "plug and play" components that may be updated or replaced in a relatively straight forward manner. The payor claim data exchange 220 may also be associated with the payor claim processing system 240 and/or a bill pre-processing system (not illustrated in FIG. 2). Such an approach might provide flexibility to integrate and accept medical bills from multiple e-bill and scanning vendors (e.g., bill intake from the devices 210), provide a correspondence library, implement workflow management, invoice PPO fees, maintain vendor files. According to some embodiments, the payor claim data exchange 220 may provide exception processing in connection with claims, such as non-standard bill processing, bill blocking, claim verification, and/or provider matching. Note that the payor claim data exchange 220 may further implement a duplicate claim identification process (e.g., to see if two claims are associated with a single treatment), document checking, expense bills tracking, validation of any edits made to claims, a reporting system (e.g., associated and integrated with a data warehouse).

The claims processing rule applied by the payor claim data exchange 220 may be based at least in party on a geographic location associated with a workers' compensation claim (e.g., claims from New York and California might be translated in different ways). According to some embodiments, the claims processing rule is associated with an automated vendor identification process. For example, the payor claim data exchange 220 might use the name and address of a care provider in an attempt locate the provider in a database. If a potential provider is found (e.g., with a 90% confidence), then the payor claim data exchange 220 might supplement the claim with further information about that vendor.

In other cases, the claims processing rule applied by the payor claim data exchange 220 might be associated with data screening, automated data population, automated data translation (e.g., in accordance with a particular protocol or language), and/or a data cleaning process. The claims processing rule is associated with a demographic analysis process (e.g., the payor claim data exchange 220 might provide demographic information about a batch of workers' compensation claims).

Figure 3:
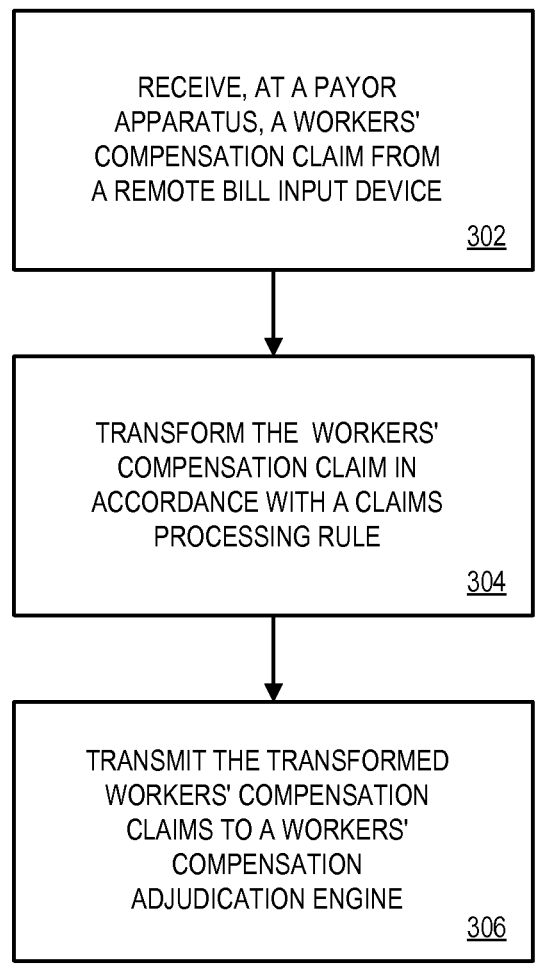
FIG. 3 illustrates a method according to some embodiments of the present invention.

FIG. 3 illustrates a method that might be performed, for example, by some or all of the elements of the system 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, workers' compensation claims are received, at a payor apparatus (e.g., a processing system), from a plurality of remote bill input devices. For example, the payor processing system might receive claims from health care providers and electronic billing services. The workers' compensation claims may then be automatically transformed at 304 in accordance with a jurisdiction-based claims processing rule. For example, claims from a first state might be re-formatted using a first rule while claims from a second state are re-formatted using a different rule. According to some embodiments, the transformation is associated with converting the workers' compensation claims into an extensible mark-up language format.

At 306, the transformed workers' compensation claims may be transmitted directly to a workers' compensation adjudication engine. For example, each claim might be transmitted after it is transformed or a batch of claims might be transmitted on a periodic basis (e.g., each night).

It might then be arranged for a health care provider to receive payment based at least in part on information subsequently received from the workers' compensation adjudication engine. Moreover, the payor processing system may export some or all of the data to a reporting system, a data warehouse, and/or a reconciliation engine. According to other embodiments, the payor processing system provides exception handling processing for flagged workers' compensation claims and/or stores image information associated with the workers' compensation claims in an image repository.

Figure 4:
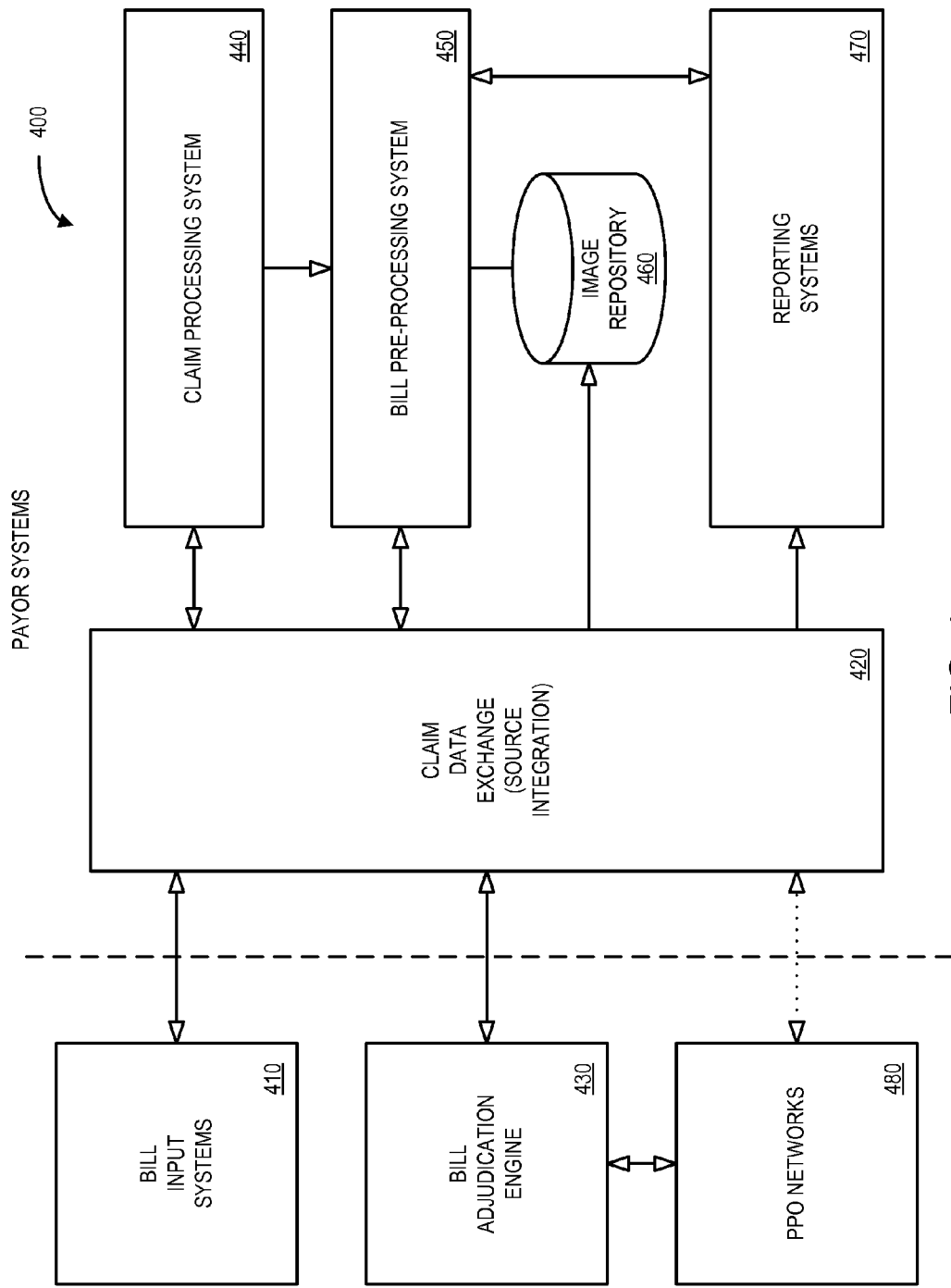
FIG. 4 is a more detailed block diagram of a system for processing workers' compensation claims according to some embodiments of the present invention.

Note that the method of FIG. 3 and the system 200 of FIG. 2 are provided only as examples, and implementations of embodiments of the present invention might be structured in any number of ways. For example, FIG. 4 is a more detailed block diagram of a system 400 for processing workers' compensation claims according to some embodiments of the present invention.

In this case, various remote bill input systems 410 may exchange information with a claim data exchange 420 (e.g., via postal mail, facsimile, public networks, and/or pharmacy networks). The bill input systems 410 may, for example, exchange bill data, images, and acknowledge messages with the claim data exchange 420 using File Transfer Protocol ("FTP") communications.

The claim data exchange 420 might process inbound and outbound information and implement key functions to de-batch files, log key elements, convert data into an Extensible Mark-Up Language ("XML") format, handle errors, generate acknowledgements and notifications, and support the generation of report analytics.

The claim data exchange 420 may then exchange information with a bill adjudication engine 430 in connection with the workers' compensation claims. For example, the claim data exchange 420 and bill adjudication engine 430 might exchange bill information, claim information, payment information, vendor data, and/or reporting information with the bill adjudication engine. The bill adjudication engine 430 may provide bill process functions, adjudicate the bills, and provide payment information to the payor. According to some embodiments, the bill adjudication engine 430 may exchange information with one or more PPO networks 480 (e.g., re-pricing data associated with payment determinations). Note that in some embodiments, the PPO networks 480 exchange information directly with the claim data exchange 420 (illustrated by a dashed arrow in FIG. 4).

The claim data exchange 420 may also exchange information with a claim processing system 440, a bill pre-processing system 450, an image repository 460 (e.g., associated with an image database), and/or a reporting system 470. The claim processing system 440 might, for example, be associated with claim demographics, injury summaries, treatment plans, and/or claim verification. According to some embodiments, the claim processing system 440 exchanges claim, payment, and vendor data with the claim data exchange 420 to support a receipt and disbursement process and/or loss reporting.

The bill pre-processing system 450 might, for example, exchange bill data with the claim data exchange 420 in connection with non-standard medical bills, verification processes, re-submission and duplicate checking, claim blocking, and/or vendor validations. The bill pre-processing system 450 might further provide exception handling functions, shadow letter generation, intake reporting, inventory reporting, and/or exception status reporting. According to some embodiments, the bill pre-processing system 450 also submits bills to the bill adjudication engine (via the claim data exchange 420) and generates work requests to create tasks and notes, including claim verification work requests. The image repository 460 may receive images from the claim data exchange 420 and provide images to the bill preprocessing system 450. The reporting systems 470 may receive reporting data from the claim data exchange 420 and/or be associated with a data warehouse (e.g., that receives a daily feed of bill data generated by the bill adjudication engine 430). The reporting systems 470 may, for example, exchange tracking data with the bill pre-processing system 450 and generate claims financial reports, actuarial services data, and PPO bulk bill reporting.

Figure 5:
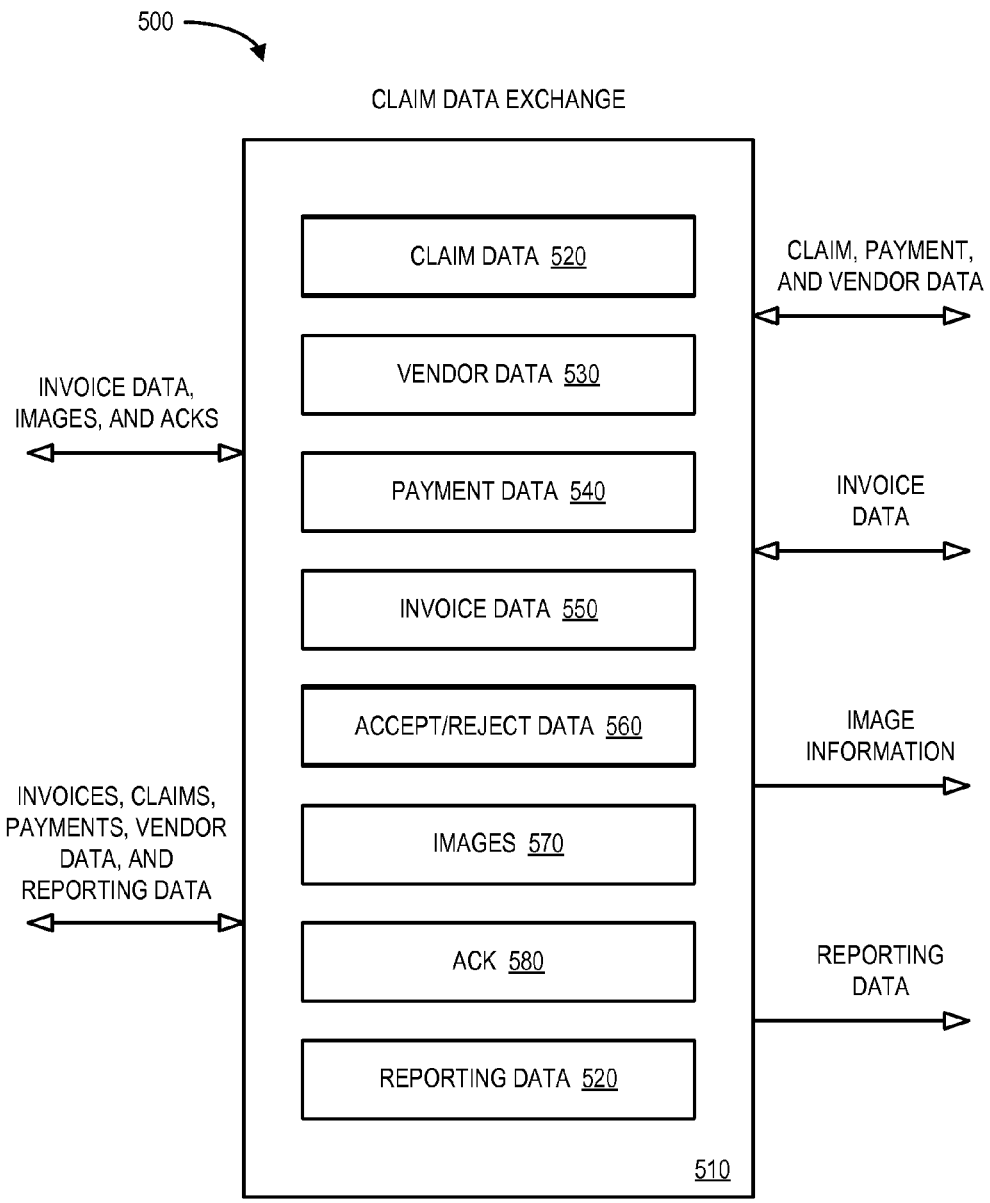
FIG. 5 is block diagram of a claim data exchange according to some embodiments of the present invention.

FIG. 5 is block diagram of a claim data exchange system 500 according to some embodiments of the present invention. The system 500 includes a claim data exchange apparatus 510 having various plug and play component elements, such as application or storage structures. Note that the system may receive and transmit data using common Input Output (IO) processing. For example, the claim data exchange apparatus 510 may store and manage information associated with claim data 520 (e.g., claimant name, address and employer); vendor data 530 (e.g., health care provider name and address); payment data 540 (e.g., amount and status or any payments made in connection with the claim); invoice data 550 (e.g., amount and vendor associated with each invoice or bill and/or associated transportation costs); accept/reject data 560 (e.g., indicating whether a claim was accepted or rejected); images 570 (e.g., pdf files of invoices and treatment notes); acknowledgements 580 (e.g., "ACK" messages transmitted to or receive other devices to ensure that message are properly received and acted upon); injury and incident data, and/or reporting data 520 (e.g., demographic and/or financial reports).

Figure 6:
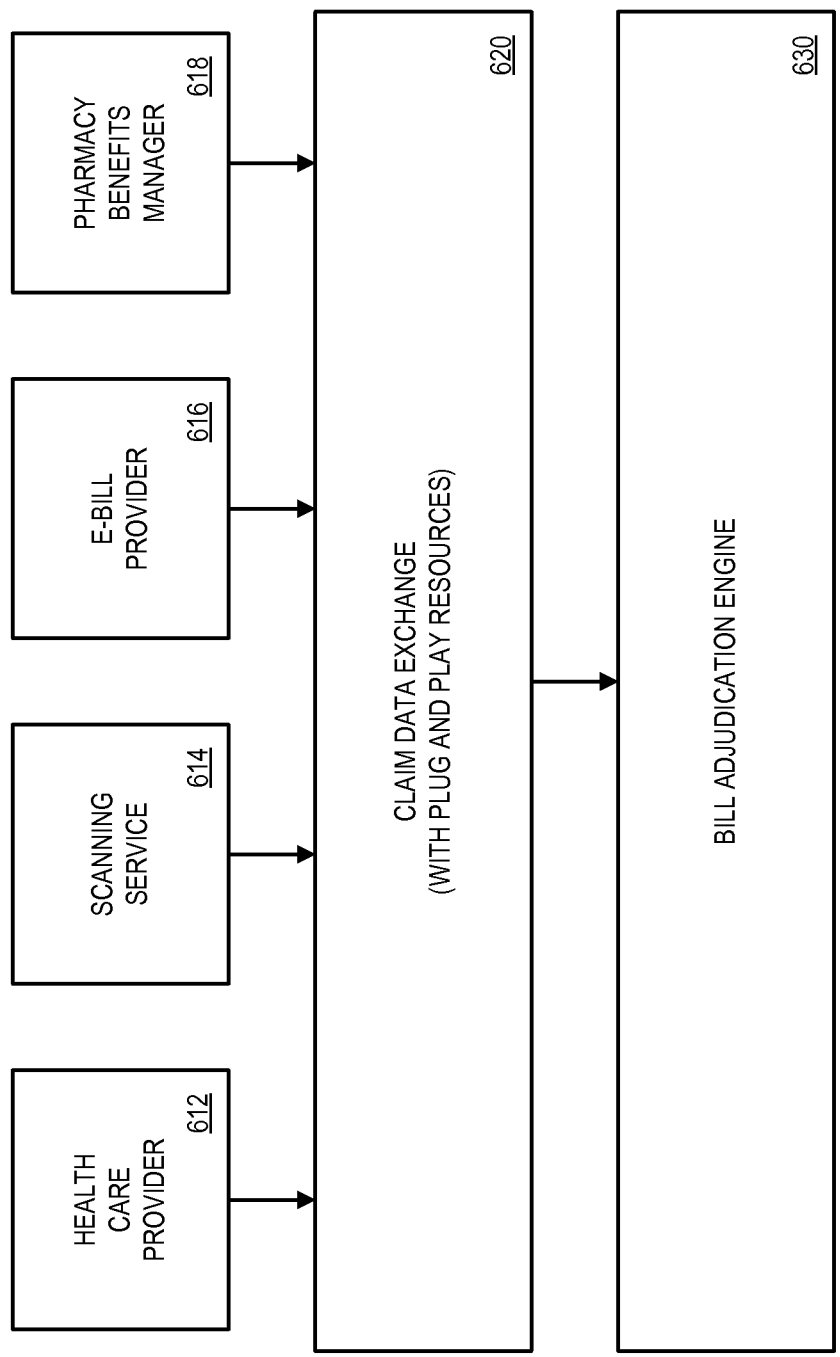
FIG. 6 is an information flow diagram according to some embodiments of the present invention.

FIG. 6 is an information flow diagram according to some embodiments of the present invention. In this case, a health care provider 612, a scanning service 614, an e-bill provider 616, and/or a pharmacy benefits manager 618 may submit claim information to a claim data exchange 620. In this case, the claim data exchange 620 (e.g., associated with a payor processing system) may receive workers' compensation claims from a plurality of remote bill input devices.

The claim data exchange 620 may automatically transform the workers' compensation claims in accordance with a jurisdiction-based claims processing rule (e.g., based on a zip code associated with a health care provider). According to some embodiments, claim data exchange 620 converts the workers' compensation claims into an extensible mark-up language format and/or exports data to a reporting system, a data warehouse, and/or a reconciliation engine. According to other embodiments, the claim data exchange 620 may provide exception handling processing for flagged workers' compensation claims and/or store image information associated with the workers' compensation claims in an image repository.

The claim data exchange 620 may then transmit the transformed workers' compensation claims directly to a workers' compensation bill adjudication engine 630. After being adjudicated, the bill adjudication engine 630 and/or claim data exchange 620 may arrange for a health care provider to receive payment based at least in part on information generated by the workers' compensation bill adjudication engine 630.

In this way, the payor claim data exchange 620 may provide significant control of certain functionality that was previously handled by third party systems (as illustrated in FIG. 1). This control may present improved opportunities, capabilities, and/or increased flexibility to respond to customer needs at a lower cost. Moreover, the claim data exchange 620 may be implemented using a "plug and play" environment while the bill adjudication engine 630 may comprise a platform supported in an Application Service Provider ("ASP") model. Such an approach may also facilitate partnering with external vendors (e.g., various e-bill providers 420) and networks for improved commodity services while reducing the need to continually modify these external applications and interfaces to incorporate payor specific requirements. This structure may also increase the ability to partner with various adjudication services, if necessary, to meet the needs of many different customers as well as partner with specialty, regional, and/or boutique networks to enhance claim outcomes and reduce network costs. Moreover, the approaches described herein may provide increased oversight through improved financial reconciliation and audit capabilities.

Figure 7:
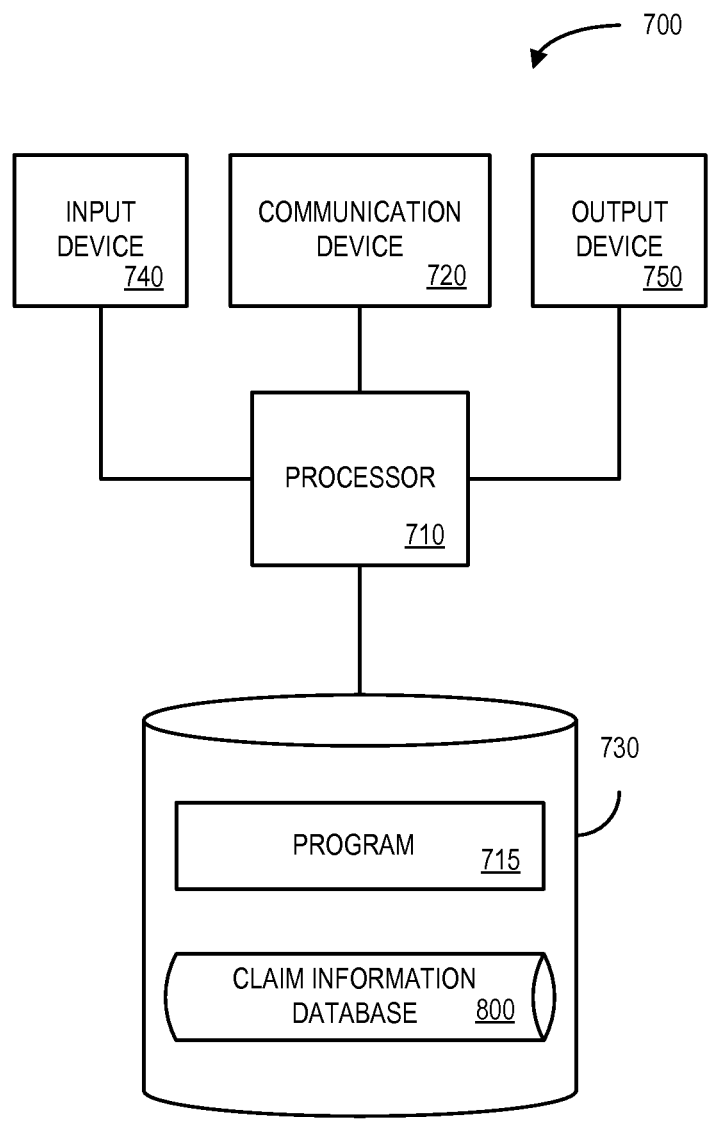
FIG. 7 is a block diagram of a claim data exchange apparatus in accordance with some embodiments of the present invention.

FIG. 7 is a block diagram of a claim data exchange apparatus 700 in accordance with some embodiments of the present invention. The apparatus 700 might, for example, comprise a platform or engine similar to the automated insurance processing platform 110 illustrated in FIG. 1. The apparatus 700 comprises a processor 710, such as one or more INTEL® Pentium® processors, coupled to a communication device 720 configured to communicate via a communication network (not shown in FIG. 7). The communication device 720 may be used to exchange insurance policy information, for example, with one or more remote devices.

The processor 710 is also in communication with an input device 740. The input device 740 may comprise, for example, a keyboard, a mouse, or computer media reader. Such an input device 740 may be used, for example, to enter information about claim rules, exception results, and/or vendors. The processor 710 is also in communication with an output device 750. The output device 750 may comprise, for example, a display screen or printer. Such an output device 750 may be used, for example, to provide reports and/or display information associated with demographic and/or financial data.

The processor 710 is also in communication with a storage device 730. The storage device 730 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein. For example, the processor 710 may receive a first workers' compensation claim from a first remote bill input device and a second workers' compensation claim from a second remote bill input device. The processor 710 may further transform the first and second workers' compensation claims in accordance with a claims processing rule and transmit the transformed first and second workers' compensation claims to a workers' compensation adjudication engine.

As used herein, information may be "received" by or "transmitted" to, for example: (i) the insurance apparatus 700 from other devices; or (ii) a software application or module within the insurance apparatus 700 from another software application, module, or any other source.

As shown in FIG. 7, the storage device 730 also stores a claim information database 800. One example of such a database 800 that may be used in connection with the insurance apparatus 700 will now be described in detail with respect to FIG. 8. The illustration and accompanying descriptions of the database presented herein are exemplary, and any number of other database arrangements could be employed besides those suggested by the figures. For example, different databases associated with different types of policies or consumers might be associated with the apparatus 700.

FIG. 8 is a tabular view of a portion of a claim information database 800 in accordance with some embodiments of the present invention. The table includes entries different insurance policies that have been issued to consumers. The table also defines fields 802, 804, 806, 808, 810 for each of the entries. The fields specify: a claim identifier 802, a claim amount 804, patient information 806, provider 808, and a claim status 810. The information in the database 800 may be periodically created and updated based on information received from bill input systems, a bill pre-processing system, a bill adjudication platform, and/or a claims processing system.

The claim identifier 802 may be, for example, an alphanumeric code associated with a workers' compensation claim that has been submitted by a health care provider. The claim amount 804 might represent a value of a requested claim or an adjusted value after adjudication. The patient information 806 might be an alphanumeric code associated with a worker who received treatment from the health care provider in connection with the claim. The provider information 808 might be an alphanumeric code associated with the health care provider who provided treatment to the injured worker. The claim status 810 might indicate, for example, that a particular claim has been scrubbed (e.g., the data has been cleaned up and/or supplemented), is considered a duplicate of a previously processed claim, is an exception (and therefore needs to be reviewed), is pending, and/or has been adjudicated or paid to the health care provider. The claim information database 800 may, for example, further be used to track each claim as it is being processed by the system and/or to generate notifications that work is waiting to be performed (e.g., an electronic message indicating that an administrator should take a particular action to help move a claim through the system).

Figure 9:
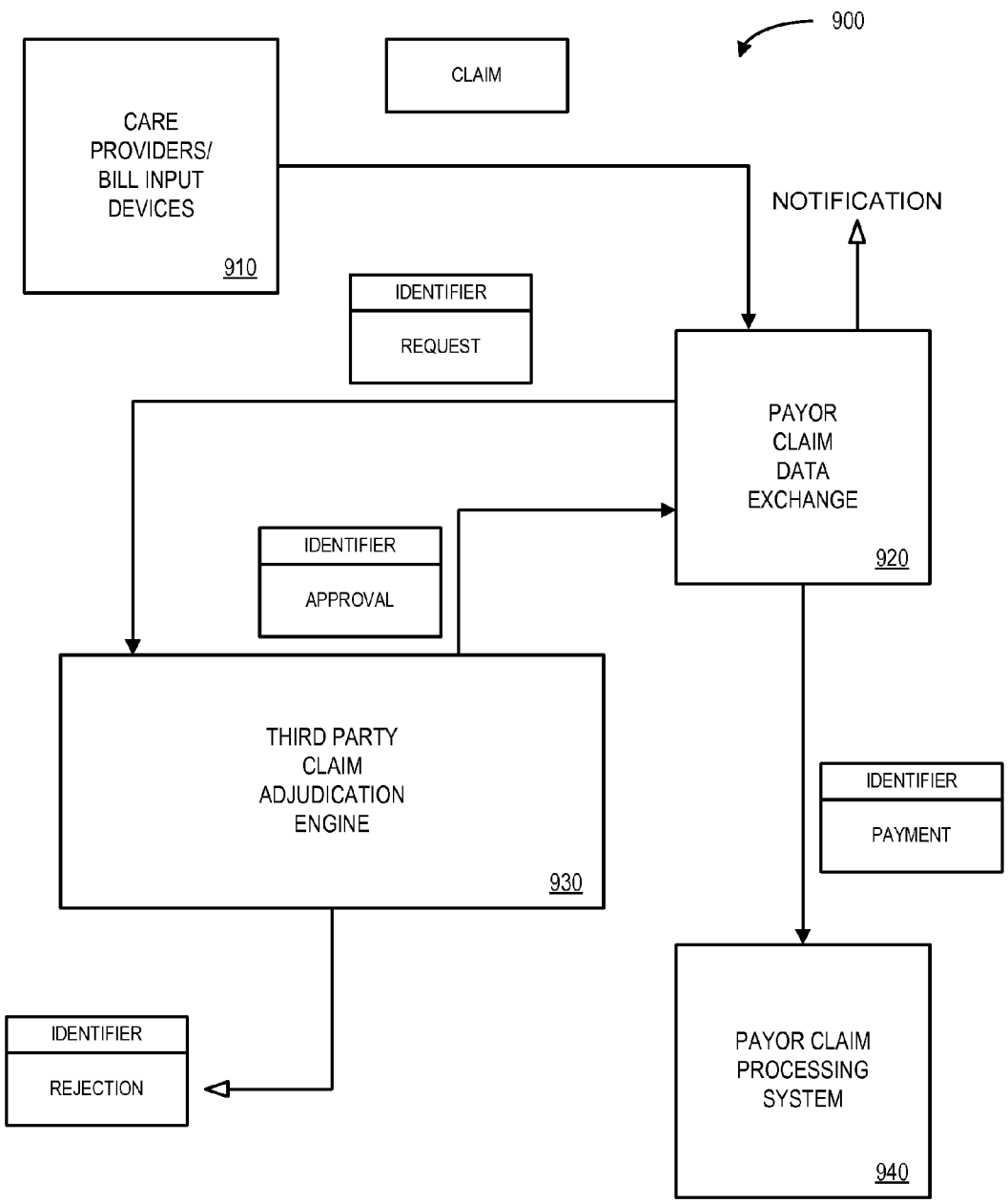
FIG. 9 is flow diagram of a how a workers' compensation claim might be processed according to some embodiments of the present invention.

For example, FIG. 9 is flow diagram 900 of a how a workers' compensation claim might be processed according to some embodiments of the present invention. In particular, a payor associated with an insurance program may facilitate payments made to health care providers 910. In this case, a care provider 910 may submit an invoice, bill, or claim to a remote payor claim data exchange 920 (e.g., by sending a paper invoice, a facsimile, or an electronic message to the payor claim data exchange 920).

The payor claim data exchange 920 may then automatically re-format the information and forward information about the claim to a third party claim adjudication engine 930 in a claim adjudication request along with an identifier (e.g., an alphanumeric code used to track the claim as it moves through the system). The third party claim adjudication engine 930 may then review the claim and determine whether or not the claim should be paid and/or an appropriate amount that should be paid to the care provider 910 (e.g., based on the workers' compensation rules applicable given the geographic location of the care provider 910). By way of examples only, the third party claim adjudication engine 930 might look for duplicate claims, incomplete or incorrect data in a required data field, and/or evaluate a claim number to determine whether or not it is valid. Claim rejections may be output along with the claim identifier for further processing.

If the request is approved, the third party claim adjudication engine 930 may then return a claim approval, along with the claim identifier, to the payor claim data exchange 920. The payor claim data exchange 920 may, according to some embodiments, automatically generate notifications (e.g., when manual process of a claim is required). The payor claim data exchange may eventually transmit payment data, along with the claim identifier, to a payor claim processing system 940, which in turn may arrange for the care provider 910 to receive payment.

As a result of the embodiments described herein, the cost of maintaining an automated claim processing system for a payor may be reduced. Moreover, the approaches may help reduce errors and result in faster payments to medical care providers. That is, embodiments may achieve cost savings and improved service levels by implementing an improved medical bill processing system to support workers' compensation medical bill processing. Further, the approaches may provide a flexible technology solution that supports the creation of a modular infrastructure (e.g., and enable partnering with specialty, regional and boutique networks to enhance claim outcomes and reduce network costs). Moreover, embodiments may provide a robust adjudication functionality that will enable the automated release of bills for workers' compensation care providers, without an individual reviewing them. The increased automation may also improve bill payment accuracy, reduce turn around time, and reduce overall costs associated with the insurance programs.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and engines described herein may be split, combined, and/or handled by external systems).

Applicants have discovered that embodiments described herein may be particularly useful in connection with workers' compensation insurance products. Note, however, that other types of insurance products may also benefit from the invention (e.g., automobile insurance claims). For example, claims associated with an automobile insurance program (e.g., repair or medical bills) might be received by an automated claims data exchange and then be automatically cleaned and forwarded to an automobile claims adjudication engine. Moreover, although examples of specific types of health care bills have been used, embodiments of the present invention could be used with other types of costs (e.g., laboratory fees).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A payor apparatus to facilitate workers' compensation insurance claims processing, comprising:
    a communication device to receive, at the payor apparatus, information from a plurality of remote bill input devices;
    a processor, at the payor apparatus and coupled to the communication device; and
    a storage device in communication with said processor and storing instructions adapted to be executed by said processor to:
        receive at the payor apparatus a first workers' compensation claim directly from a first remote bill input device;
        receive at the payor apparatus a second workers' compensation claim directly from a second remote bill input device;
        determine a first geographic location associated with the first workers' compensation claim;
        determine a second geographic location associated with the second workers' compensation claim;

select, from a set of potential claims processing rules, a first claims processing rule for the first workers' compensation claim based on the first geographic location;

select, from the set of potential claims processing rules, a second claims processing rule for the second workers' compensation claim based on the second geographic location;

transform the first workers' compensation claim in accordance with the first claims processing rule;

transform the second workers' compensation claim in accordance with the second claims processing rule; and transmit the transformed first and second workers' compensation claims directly from the payor apparatus to a third-party workers' compensation adjudication engine.

2. The apparatus of claim 1, wherein at least one of the first and second remote bill input devices are associated with at least one of: (i) a health care provider, (ii) a scanning service, (iii) an e-bill provider, and (iv) a pharmacy benefits manager.

3. The apparatus of claim 1, wherein said communication device and processor are associated with a claim data exchange.

4. The apparatus of claim 3, wherein the claim data exchange further communicates with at least one of: (i) a claim processing system, (ii) a bill pre-processing system, (iii) an image repository, and (iv) a reporting system.

5. The apparatus of claim 1, wherein the first claims processing rule is associated with an automated vendor identification process.

6. The apparatus of claim 1, wherein the first claims processing rule is associated with a duplicate claim identification process.

7. The apparatus of claim 1, wherein the first claims processing rule is associated with at least one of: (i) data screening, (ii) automated data population, (iii) automated data translation, and (iv) a data cleaning process.

8. The apparatus of claim 1, wherein the first claims processing rule is associated with a demographic analysis process.

9. A computer-implemented method to facilitate workers' compensation insurance claims processing, comprising:

receiving, at a payor processing system, data indicative of workers' compensation claims from a plurality of remote bill input devices;

storing the workers' compensation claims data in a storage device accessing the stored workers' compensation claims data to determine jurisdictions associated with each of the workers' compensation claims;

automatically transforming different workers' compensation claims in accordance with different jurisdiction-based claims processing rules; and transmitting, via a communication network, the transformed workers' compensation claims directly to a workers' compensation adjudication engine.

10. The method of claim 9, further comprising:
converting the workers' compensation claims into an extensible mark-up language format.

11. The method of claim 9, further comprising:
arranging for a health care provider to receive payment based at least in part on information received from the workers' compensation adjudication engine.

12. The method of claim 9, further comprising:
exporting data to at least one of: (i) a reporting system, (ii) a data warehouse, and (iii) a reconciliation engine.

13. The method of claim 9, further comprising:
providing exception handling processing for flagged workers' compensation claims.

14. The method of claim 9, further comprising:
storing image information associated with the workers' compensation claims in an image repository.

15. A computer-readable medium storing instructions adapted to be executed by a processor to perform a method to facilitate workers' compensation insurance claims processing, said method comprising:

receiving, at a payor processing system, workers' compensation claims from a plurality of remote bill input devices;

determining jurisdictions associated with each of the workers' compensation claims;

automatically transforming different workers' compensation claims in accordance with different jurisdiction-based claims processing rules; and transmitting the transformed workers' compensation claims directly to a workers' compensation adjudication engine.

16. The computer-readable medium of claim 15, wherein said method further comprises:
converting the workers' compensation claims into an extensible mark-up language format.

17. The computer-readable medium of claim 15, wherein said method further comprises:
arranging for a health care provider to receive payment based at least in part on information received from the workers' compensation adjudication engine.

18. The computer-readable medium of claim 15, wherein said method further comprises:
exporting data to at least one of: (i) a reporting system, (ii) a data warehouse, and (iii) a reconciliation engine.

19. The computer-readable medium of claim 15, wherein said method further comprises:
providing exception handling processing for flagged workers' compensation claims.

20. The computer-readable medium of claim 15, wherein said method further comprises:
storing image information associated with the workers' compensation claims in an image repository.

21. A payor apparatus to facilitate workers' compensation insurance claims processing, comprising:

a communication device to receive, at the payor apparatus, information from a plurality of remote bill input devices;

a processor coupled to the communication device; and a storage device in communication with said processor and storing instructions adapted to be executed by said processor to:

receive a first type of input data, associated with a first data transformation engine and being associated with workers' compensation claims, receive a second type of input data, associated with a second type of data transformation engine and being associated with workers' compensation claims, wherein the first and second types of data transformation engines comprise different plug and play module components of a claim data exchange;

determine jurisdictions associated with each of the workers' compensation claims;

transform, by the first type of data transformation engine, a first subset of workers' compensation claims in accordance with a first jurisdiction-based claims processing rule;

transform, by the second type of data transformation engine, a second subset of workers' compensation claims in accordance with second jurisdiction-based claims processing rule; and transmit transformed workers' compensation claims directly to a workers' compensation adjudication engine.

\* \* \* \* \*